Sept. 9, 1969  K. O. JOHNSON ET AL  3,466,483
SINTERED ROTOR FOR AN ELECTRIC MOTOR
Filed Dec. 4, 1967  2 Sheets-Sheet 1
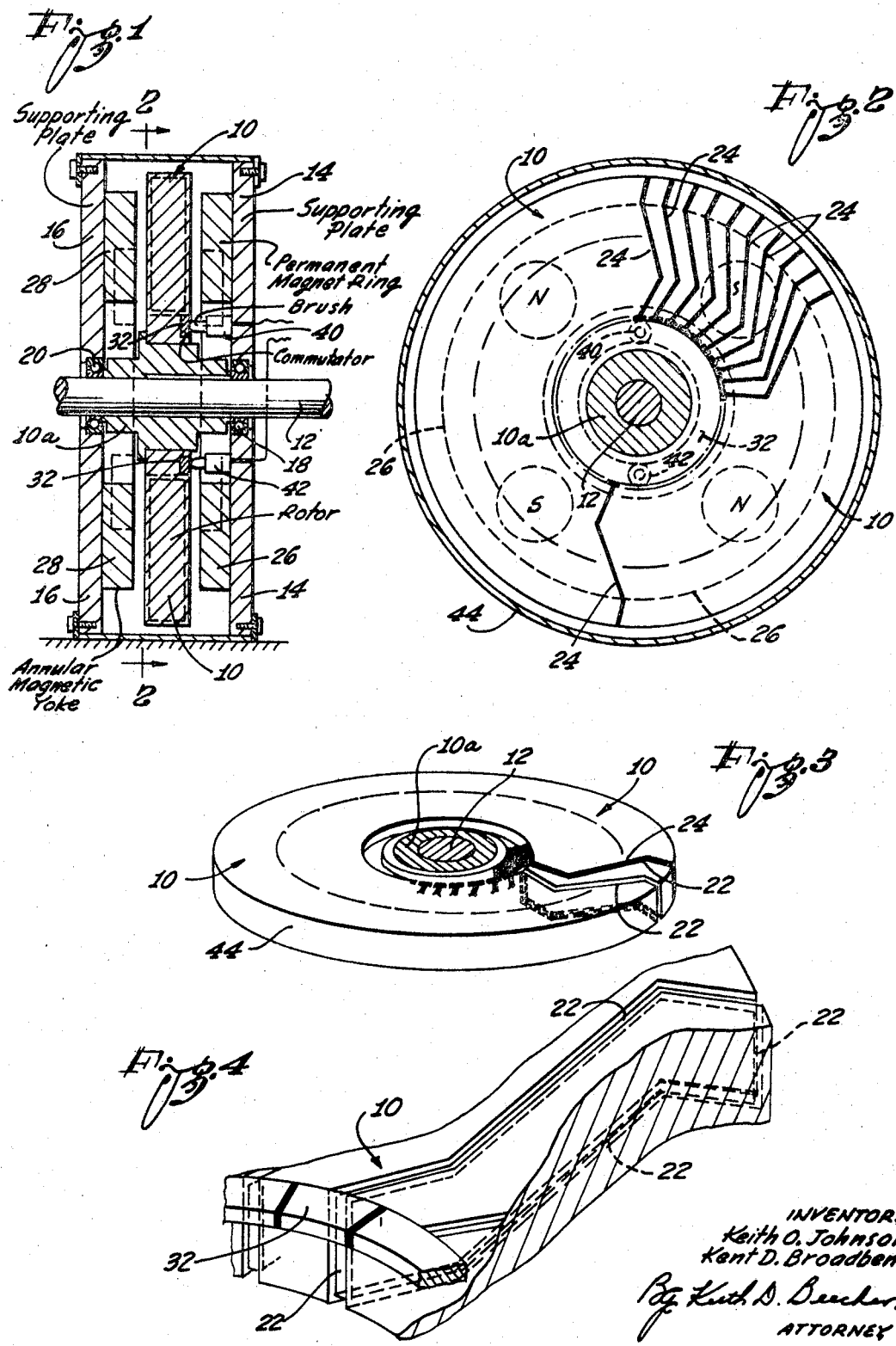
INVENTORS:
Keith O. Johnson
Kent D. Broadbent
ATTORNEY

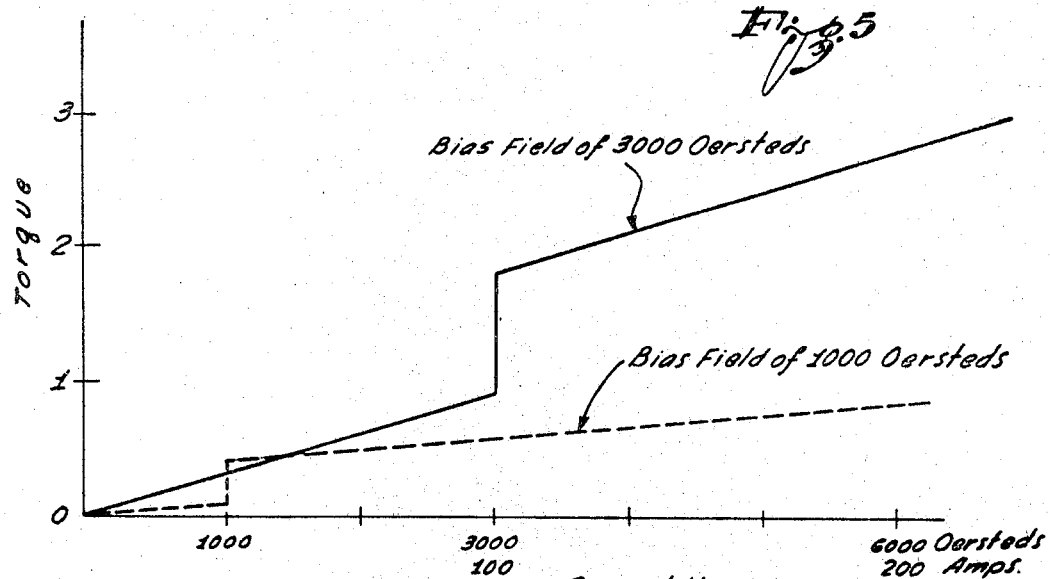
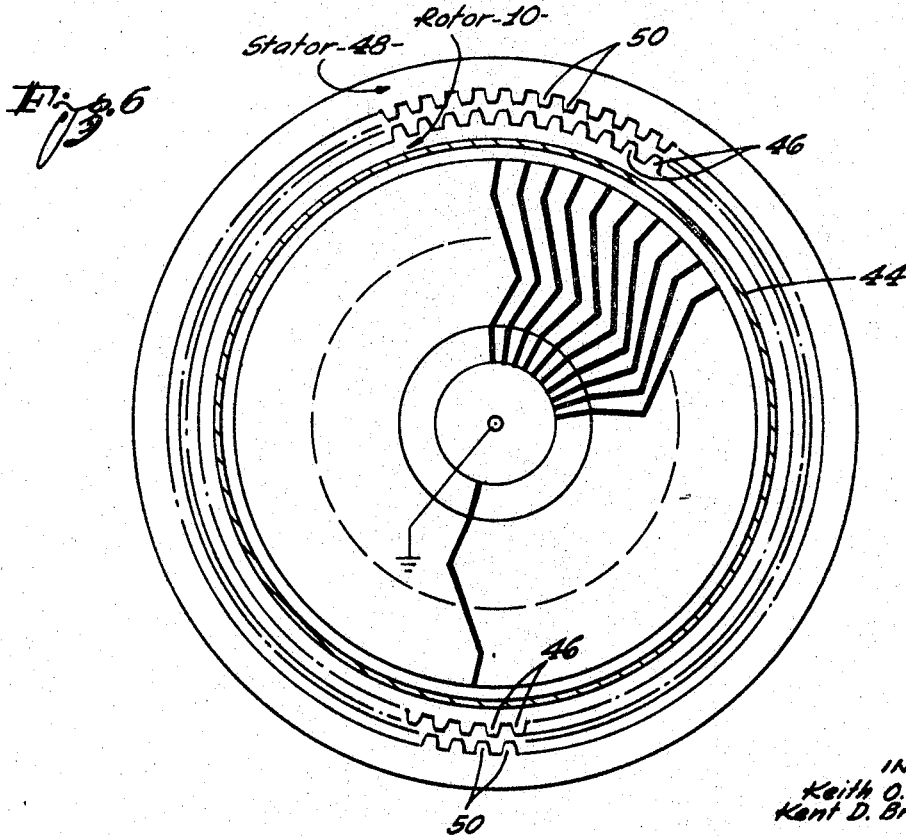

United States Patent Office 3,466,483
Patented Sept. 9, 1969

3,466,483
SINTERED ROTOR FOR AN ELECTRIC MOTOR
Keith O. Johnson, Los Angeles, and Kent D. Broadbent, San Pedro, Calif., assignors to Gauss Electrophysics, Inc., Santa Monica, Calif., a corporation of California
Filed Dec. 4, 1967, Ser. No. 687,521
Int. Cl. H02k 1/22
U.S. Cl. 310—268                                            7 Claims

ABSTRACT OF THE DISCLOSURE

An electric motor is provided which includes a rotor composed of a thin disc of sintered magnetic insulating material, such as powdered ferrite, and which includes a rotor winding on the disc in the form of a conductive pattern formed on both faces of the disc and mounted in grooves in the disc to extend as a continuous winding, the rotor winding being formed of a sintered electrically conductive material, such as powdered copper. The resulting motor has the advantages over the prior art in that it can be operated at extremely high temperatures since there is no insulation to burn, and relatively small motors constructed in accordance with the invention can develop high horsepower ratings.

Background of the invention

Electric motors are known which have disc-shaped printed circuit rotors. Such a rotor usually comprises a thin disc of insulating material which supports the rotor winding. The rotor winding is in the form of a conductive pattern which is coated on both faces of the disc, with connections extending over the inner and outer peripheral edges of the disc.

The present invention contemplates that the rotor disc, instead of being formed of an insulating material, be of a sintered construction. That is, the rotor is formed of a material, such as a powdered ferrite, or other powdered ferro-magnetic material, which is compressed under high pressure into a compact shape, and which is then subjected to sintering temperatures to form the disc.

The resulting sintered rotor disc, in accordance with the concepts of the present invention, has grooves formed in it during the sintering process. Sintered copper conductors, or sintered conductors of other suitable conductive material, are either simultaneously or subsequently formed in the grooves in the sintered rotor disc so as to provide the rotor winding.

The resulting rotor has certain advantages over the prior art printed circuit rotor in that, since there is no insulation to burn, the motor of the present invention can be operated at extremely high temperatures. This means that relatively small motors can be built to develop high horsepower ratings. If desired, a cooling turbine can be mounted on the rotor shaft to draw in cooling air, and thereby permit yet higher operating temperatures.

For example, a motor constructed in accordance with the present invention can be light and flat, of the order of 3 inches diameter by 4 inches thickness. Yet, the motor can develop 20 inch ounces torque at 10,000 r.p.m., for example. The particular motor draws current of the order of 30–50 amperes at 150 volts, and develops a field of 3,000 gauss and dissipates 400 watts of power at 50% efficiency. Horsepower developed by this motor is equal to (torque×speed) constant.

The sintered disc rotor of the motor of the invention has a continuous conductive winding thereon, as mentioned above. The winding itself may be formed of a sintered construction, as suggested previously, and can be formed either simultaneously with the formation of the rotor, or subsequently thereto. In the construction of the rotor winding, the winding may be continuous, since there is no need to provide separate connecting means through the rotor, or to provide soldered terminals, as is the case with the printed circuit rotor.

Moreover, since the rotor of the present invention is of a metal oxide construction, it acts as a heat sink and rapidly conducts heat away from the winding, so that high heat dissipation is possible. The conductors themselves can be relatively thick, as compared with the printed circuit rotor, for relatively high current carrying capabilities.

The rotor of the present invention is such that a commutator may be formed directly on it, so that there is no need to commutate on the conductors themselves, as is the case with the printed circuit rotor. This reduces the commutation losses and heat generated during the commutation process. The commutator, as will be described, can also be formed of a sintered powdered material.

The construction of the rotor of the present invention is such that it can be made to exact tolerances. The stator of the motor also can be made of sintered materials, if so desired. Moreover, tachometer teeth can be easily formed on the periphery of the rotor to form a basis for a speed control system for the motor.

Brief description of the drawings

FIGURE 1 is a side section showing a motor constructed in accordance with one embodiment of the invention;

FIGURE 2 is a section, taken essentially along the line 2—2 of FIGURE 1;

FIGURE 3 is a perspective view of the rotor of the motor shown in FIGURE 1, and illustrating the shape of the grooves formed in the rotor for receiving the rotor winding, and the manner in which the winding extends through the grooves;

FIGURE 4 is a fragmentary perspective view, further showing the shape of the grooves;

FIGURE 5 is a plot of torque in arbitrary units versus rotor current within the motor; and FIGURE 6 shows a suggested configuration for a tachometer construction integral with the motor.

Detailed description of the illustrated embodiment

As shown in the drawings, the motor includes a disc-shaped rotor 10 which, as described above, is formed of a sintered ferro-magnetic material, such as a ferrite. As best shown in FIGURE 1, for example, the rotor has a hub 10a which is keyed to a drive shaft 12; the drive shaft being mounted in a pair of support plates 14 and 16 by appropriate bearings 18 and 20.

The rotor 10 is formed with grooves extending radially across both its faces, such as the groove 22 shown in FIGURES 3 and 4. A plurality of electrical conductors 24 are formed in the grooves with a configuration, such as shown in FIGURE 2. It will be appreciated, of course, that the radial conductors extend in side-by-side relation around the entire face of the rotor. The conductors are formed either during the formation of the rotor or subsequently thereto. They extend around the inner edge and outer edge of the rotor disc so as to form a continuous winding.

An annular permanent magnet ring 26 is supported on the support plate 14, and this ring is magnetized, for example, to exhibit north and south poles in the positions shown in FIGURE 2.

The permanent magnet ring 26 is mounted coaxially with the axis of rotation of the rotor 10 and drive shaft 12. An annular magnetic yoke 28 is supported on the support plate 16, likewise in coaxial relationship with the rotor 10, and in facing relationship with the ring 26.

A commutator 32 is formed on a face of the rotor 10, in contact with respective ones of the conductors 24 which makes up the aforesaid rotor winding. The commutator 32, likewise, may be formed of sintered conductive material, and is made up to the usual conductive and non-conductive segments. A brush, such as the brush 40, is spring-biased into contact with the commutator, so that the appropriate electrical connections may be made to the winding 24. A second brush 42 is also connected to the commutator to provide a return path from the brush 40.

The rotor disc 10 is fabricated, for example, by using a ferrite powder which is compacted by molding it in a die of the appropriate shape under pressures, for example, of between 25–50 tons per square inch. After the rotor shape has been created by the aforesaid molding, the rotor is sintered at temperatures, for example, of between 2000° F. and 2050° F. for a period of approximately 15–60 minutes in a nitrogen atmosphere. Upon the completion of the sintering process, the rotor is heat stable at the sintering temperatures, and will neither expand or contract when subjected to such temperatures.

At the completion of the formation of the rotor 10, for example, having the aforesaid grooves 22 formed therein, a powdered conductive metal, such as powdered copper, is inserted in the grooves, and compressed by a suitable die, and sintered in a manner similar to that described above. For example, the conductors may be made from a mixture of tin and copper powders at a pressure of 15–25 tons per square inch. The commutator 32 may be formed in like manner in a central annular groove in the disc-like rotor 10, the groove having radial walls molded into it to form the nonconductive segments between the commutator segments. The conductors 24 and the commutator 32 may be sintered in a nitrogen atmosphere, for example, at temperatures between 1450° F. and 1600° F. for a period of between 15 and 20 minutes.

During the sintering, the conductors 24 and the commutator segments 32 will expand more than the ferrite material forming the core 10, resulting in a strong physical bond between the conductors and commutator segments on one hand and the rotor on the other. The electrical characteristics of the resulting motor are similar to those of the printed circuit motor described in Swiggett Patent 2,970,238.

The conductor pattern is such, that current entering by the brush 40 and leaving by the brush 42 flows around a conductive winding path in a manner to create appropriate fluxes with respect to the fluxes created by the permanent magnets formed in the ring 26. The resulting fluxes are such that the rotor is caused to turn, thereby exerting the desired torque on the drive shaft 12.

As mentioned above, the sintered construction of the rotor assembly is such that the conductors 24 may be relatively large, as compared with the usual printed circuit conductors, so as to be capable of carrying relatively high currents. Also, the motor of the invention may be operated at relatively high currents in the rotor windings, since there is no insulation creating a threshold in operating temperatures.

The sintered material for the rotor possesses high tensile strength. However, such sintered material conversely has low fatigue strength. Therefore, desirable properties of the sintered material are utilized for producing this particular rotor construction and low fatigue strength may be compensated for by placing a metal retaining band 44 around the periphery of the sintered rotor. Thus physical properties relating to fatigue strength for this sintered material may thereby be increased.

Since the mass of the sintered material is considerably greater than that of other conventional materials previously used in rotor construction the centrifugal forces acting upon this material during operation of the motor are therefore significantly increased. Thus the provision of a metal band around the formed rotor structure mitigates the effect of centrifugal force tending to disrupt the structure.

It has been noted that after fatigue the sintered material has approximately ⅕ the tensile strength of laminated phenolic, for example, previously found in rotor construction. Also it is noted that the sintered material has four times the density of laminated phenolic, for example. Thus there exists an approximate twenty times greater likelihood for fracture of the sintered material than for a laminated phenolic material. However, as indicated above, these inherent disadvantages may be overcome in the construction of the rotor of this invention by the provision of a closely fitting metal band around the periphery of the sintered rotor, for example. The construction of the sintered rotor of this invention not only increases the tensile strength for the sintered material but also mitigates the effect of centrifugal force for fracturing the sintered material during the operation of the motor. Thus, disadvantages of the sintered material are overcome while the inherently advantageous physical properties of the material are effectively utilized for producing a motor construction having operation characteristics heretofore unrealized in the electrical motor art.

In describing the operation of the electrical motor of this invention the term coercivity is used herein. Coercivity is defined as that magnetic field value which will magnetically saturate the rotor material in the vicinity of the sintered electrical conductors. In the rotor construction of this invention coercivity has been found to exist at approximately 30 oersteds. However coercivity could exist in the range of from a few oersteds to several hundred oersteds. It has been noted in the operation of rotors made of sintered material that the magnetic field created by the permanent magnets within the motor tends to polarize the sintered rotor material is a manner which is complementary to the field normally produced by the permanent magnets. Thus the rotor is thereby magnetically saturated in a manner which will not produce torque forces. However, it is noted that when the magnetic field created by electrical current within the sintered conductors is such that it opposes the permanently established magnetic field within the motor so that the coercivity condition thereby is effected a magnetic field within the rotor construction is thereby provided which produces significant torque forces.

Referring to FIGURE 5, it is seen that the current flowing in the sintered conductors and the magnetic field produced by current flowing through the conductors is plotted horizontally and torque forces are plotted vertically. Initially, torque forces within the motor are produced by the interaction of the magnetic field produced by current flowing through the sintered conductors and the magnetic field produced by the permanent magnets within the motor. However, as shown in FIGURE 5, when the rotor is polarized, that is, the magnetic field produced by the current in the conductors is such that the coercivity of the rotor is reached, a switching like effect is produced and a considerable increase in torque force is realized. For example, referring to the plot shown in FIGURE 5, it is noted that when the magnetic field produced by the permanent magnets with the motor is approximately 1000 oersteds the torque forces within the motor are produced by the interaction of the field produced by the permanent magnets and the field produced by the current in the conductors. However, when the current within the conductors produces a magnetic field of approximately 1030 oersteds, significantly increased torque force is realized. It is to be noted that at this point the torque force increases approximately four times in magnitude without any appreciable increase in current or bias magnetic field. At this point, torque force is increased by the product of the bias field and the polarized rotor contribution.

In FIGURE 5, conditions have been shown where the electrical motor bias field is 3000 oersteds. In this condition coercivity would be produced by a current flowing induced magnetic field within the rotor of approximately 3030 oersteds. In this instance, it is to be observed that the torque force increases approximately two times in magnitude without any appreciable increase in current or bias magnetic field. Thus, it may be seen by reference to FIGURE 5 that considerable gains in torque force may be realized at relatively low values for the permanent magnetic field produced within the electrical motor of this invention.

From reference to FIGURE 5, it is apparent that electrical motor construction utilizing the sintered rotor concepts disclosed herein provides effective construction concepts capable of considerably increasing torque forces, partiularly in low permanent magnetic field range. Thus, the sintered rotor construction of this invention makes it at once possible and feasible to use low cost, low intensity bias magnetic materials within such electrical motor construction.

FIGURE 6 show an illustration of rotor and stator structure utilizing the sintered rotor of this invention wherein a tachometer is thereby provided. The metal ring 44 surrounding the rotor 10, which as indicated hereinbefore provides increased strength for the rotor, may be constructed in the form of gear teeth 46, for example, as shown in FIGURE 6. Likewise, the interior structure of the stator 48 may be provided with a similar gear teeth configuration 50. By means of such a gear teeth construction on the rotor and stator variable capacitance is thereby created between the rotor and stator.

The utilization of the variable capacitance structure between the rotor and stator as shown in FIGURE 6 may be effectively utilized for producing a most effective and efficient tachometer structure. As the rotor and stator move relative to one another, the capacitance which exists between the rotor and stator structure will thereby be varied. The variation in capacitance may be measured since such variation will be of a cyclic nature, going from a maximum to a minimum value over a given period of time for a particular revolution rate for the motor. The tachometer function provides a closed loop arrangement for this motor structure which lends itself to effective utilization in the operation of such a motor for several motor applications, for example.

The particular type of gear tooth capacitor structure as shown in FIGURE 6 provides a structural configuration which effectively eliminates a condition contributing to inaccuracy of tachometer measurement. For example, it is to be observed that the tooth structure for both the rotor and stator will have a fixed configuration once they are assembled. The maximum and minimum capacitance values created by the relative movement of the rotor and stator will be created by a large number of the gear teeth structures during a time of their closest approach and their greatest separation. Thus, the maximum and minimum capacitance values are created by an average of a large number of spatial relationships. Therefore greater measurement accuracy is thereby produced than heretofore has been available since in most instances known in the prior art only the spatial relationships of only one, or perhaps a few objects have been utilized in establishing tachometer readings.

The motor described herein is relatively simple to construct, and is rugged and durable. Also, and as noted previously herein, the resulting motor is light in weight and extremely compact.

Naturally, the concepts of the present invention may be applied to a wide variety of structures, and the illustrated embodiment is intended to be merely representative of one particular structure. The invention itself, together with any modifications which fall within the inventive concept, are intended to be covered in the following claims.

What is claimed is:

1. In an electric motor, a rotor assembly including: a rotor disc formed of sintered ferro-magnetic insulating material and having grooves therein; and a rotor winding formed of electrically conductive material disposed in said grooves in said rotor disc and extending as a continuous winding on both sides of said disc, said rotor winding being formed to include sintered powdered electrically conductive material.

2. The rotor assembly defined in claim 1 in which said rotor winding is formed to include sintered powdered copper.

3. The rotor assembly defined in claim 1 and which includes an annular commutator formed on one face of said rotor disc in electrical connection with said rotor winding and concentric with the axis of rotation of said rotor.

4. The rotor assembly defined in claim 3 in which said commutator is formed of sintered powdered electrically conductive material.

5. The rotor assembly defined in claim 1 in which a retaining band surrounds the periphery of said rotor disc.

6. The rotor assembly defined in claim 5 in which the outer periphery of said retaining band has gear teeth configuration.

7. In an electric motor in accordance with claim 1, a stator having gear teeth configuration on the peripheral surface proximate said rotor assembly.

References Cited

UNITED STATES PATENTS

| 2,604,502 | 7/1952 | Felici | 310—237 |
| 2,721,278 | 10/1955 | Baumann | 310—261 |
| 3,101,425 | 8/1963 | Moressee | 310—237 |
| 3,163,788 | 12/1964 | Powers | 310—261 |
| 3,243,872 | 4/1966 | Henry-Baudot | 310—237 |

MILTON O. HIRSHFIELD, Primary Examiner

R. SKUDY, Assistant Examiner